United States Patent
Weatherall et al.

(10) Patent No.: US 9,760,256 B1
(45) Date of Patent: Sep. 12, 2017

(54) SECURING A WINDOW SYSTEM SUPPORTING TRANSPARENCY

(71) Applicant: GOOGLE INC., Mountain View, CA (US)

(72) Inventors: James Neil Weatherall, Kirkland, WA (US); Gary Kacmarcik, Bothell, WA (US); David Edwin Levin, Kirkland, WA (US)

(73) Assignee: Google Inc., Mountain View, CA (US)

( * ) Notice: Subject to any disclaimer, the term of this patent is extended or adjusted under 35 U.S.C. 154(b) by 268 days.

(21) Appl. No.: 14/319,710

(22) Filed: Jun. 30, 2014

(51) Int. Cl.
  *G06F 3/048* (2013.01)
  *G06F 3/0484* (2013.01)
  *G06F 3/0481* (2013.01)

(52) U.S. Cl.
  CPC .......... *G06F 3/0484* (2013.01); *G06F 3/0481* (2013.01); *G06F 2203/04804* (2013.01)

(58) Field of Classification Search
  CPC .......... G06F 21/51; G06F 2203/04804; G06F 3/0484; G06F 3/0481
  See application file for complete search history.

(56) References Cited

U.S. PATENT DOCUMENTS

| | | | | |
|---|---|---|---|---|
| 6,633,310 B1* | 10/2003 | Andrew | ................ | G06F 3/0481 715/728 |
| 8,413,236 B1* | 4/2013 | Hansen | ................ | G06F 21/50 726/22 |
| 8,914,881 B2* | 12/2014 | Lekies | ................ | G06F 21/51 380/28 |
| 9,501,460 B1* | 11/2016 | Battre | ................ | G06F 17/24 |
| 2010/0281537 A1* | 11/2010 | Wang | ................ | G06F 9/468 726/22 |
| 2014/0041023 A1* | 2/2014 | Lekies | ................ | G06F 21/51 726/22 |
| 2014/0115701 A1* | 4/2014 | Moshchuk | ................ | G06F 21/51 726/23 |
| 2014/0230056 A1* | 8/2014 | Hansen | ................ | G06F 21/50 726/22 |

(Continued)

OTHER PUBLICATIONS

Michal Zalewski, "Dealing with UI redress vulnerabilities inherent to the current web," Sep. 25, 2008, http://lists.whatwg.org/pipermail/whatwgwhatwg.org/2008September/016284.html.*

(Continued)

*Primary Examiner* — Doon Chow
*Assistant Examiner* — Andrew T Chiusano
(74) *Attorney, Agent, or Firm* — Brake Hughes Bellermann LLP

(57) ABSTRACT

According to an aspect, a computing device may include a window system configured to receive window region information and transparency information for a window rendered from an application. The transparency information may indicate that transparency is enabled for the window. The window region information may define a region within the window. The window system may be configured to modify an original frame of the window to create a modified frame based on the window region information and the transparency information such that the region within the window for the modified frame meets a threshold level of transparency. The computing device may include a graphical user interface configured to provide a display of the window with the modified frame.

17 Claims, 5 Drawing Sheets

(56) References Cited

U.S. PATENT DOCUMENTS

2014/0344737 A1* 11/2014 Bonura ................ G06F 3/0481
715/768

OTHER PUBLICATIONS

Giorgio Maone, "Hello ClearClick, Goodbye Clickjacking!" Jan. 4, 2010, https://web.archive.org/web/20100104115239/http://hackademix.net/2008/10/08/helloclearclickgoodbyeclickjacking.*

Lin-Shung Huang et al., "Clickjacking: Attacks and Defenses," USENIX Security '12, 2012.*

* cited by examiner

SECURING A WINDOW SYSTEM SUPPORTING TRANSPARENCY

BACKGROUND

In some examples, a window system may support full window transparency. For example, a first window from an instance of an application may be displayed on the desktop environment, and a second window from an instance of the same or different application may be displayed on the desktop environment in a manner that the second window overlaps with the first window where the first window is in the foreground ("in focus") and the second window in the background. In some instances, the first window may be completely transparent, thereby visibly showing only the second window.

However, the window systems that support window transparency may be susceptible to attacks such as click-jacking attacks or click-through attacks. For example, an attacker may place a completely transparent window on top of an existing window (e.g., the completely transparent window is in the foreground). Because the user will believe he/she is interacting with the existing (underlying) window (due to the transparency of the attacker's window), input provided by the user which is meant for the underlying window can be captured by the attacker's window. Alternatively, an attacker may place an opaque pass-through region of a window over a hit-region of an underlying window (thereby hiding the underlying hit-region), where the opaque pass-through region is meant to deceive the user into an input event on the hidden hit-region. Because the opaque region of the attacker's window is a pass-through area, any user input on this region will pass-through resulting in an unintended computer action.

SUMMARY

The details of one or more implementations are set forth in the accompanying drawings and the description below. Other features will be apparent from the description and drawings, and from the claims.

According to an aspect, a computing device may include a window system configured to receive window region information and transparency information for a window rendered from an application. The transparency information may indicate that transparency is enabled for the window. The window region information may define a region within the window. The window system may be configured to modify an original frame of the window to create a modified frame based on the window region information and the transparency information such that the region within the window for the modified frame meets a threshold level of transparency. The computing device may include a graphical user interface configured to provide a display of the window with the modified frame.

The computing device may have one or more of the following features (or any combination thereof). The threshold level of transparency may limit the transparency of the region such that the region is at least partially visible to a user. The region defined by the window region information may include a hit-region. The hit-region may be an area within the window that accepts an input event. In other examples, the region defined by the window region information may include a pass-through region. The pass-through region may be an area within the window that passes-through an input event to an underlying window or a desktop of the graphical user interface. The threshold level of transparency may include a first threshold level of transparency and a second threshold level of transparency. The region defined by the window region information may include a hit-region, and an area outside the hit-region may be defined as a pass-through region. The window system may be configured to create the modified frame such that the hit-region meets the first threshold level of transparency and the pass-through region meets the second threshold level of transparency. The second threshold level of transparency may be different than the first threshold level of transparency. The region defined by the window region information may be a hit-region, and the window system is configured to dynamically adjust a transparency of the hit-region upon detection of an input event outside the hit-region including removing the threshold level of transparency constraint such that the hit-region is completely or substantially transparent. The window system may be configured to receive a request for full transparency of a hit-region of the window, and the window system is configured to create the modified frame such that the hit-region is completely or substantially transparent during a period of time after which the hit-region is constrained by the threshold level of transparency. The window system may include a windows manager configured to generate a filter based on the region defined by the window region information, and a visual processing unit configured to modify the original frame to create the modified frame by applying the filter to the original frame. The windows manager may be implemented within a browser. The visual processing unit may be implemented as a graphics processing unit (GPU).

According to another aspect, a method for rendering a window of an application may include receiving, by a window manager, transparency information and window region information for a window to be rendered from an application. The transparency information may indicate that transparency is enabled for the window. The window region information may define a hit-region within the window. The method may include generating, by the window manager, a filter based on the hit-region identified by the window region information, receiving, by a visual processing unit, the filter generated by the window manager, and applying, by the visual processing unit, the filter to an original frame of the window to create a modified frame such that the hit-region of the window meets a first threshold level of transparency and a region outside the hit-region meets a second threshold level of transparency. The first threshold level of transparency may be different than the second threshold level of transparency. The method may further include providing, by the visual processing unit, a display of the window with the modified frame on a graphical user interface such that the hit-region is at least partially visible to a user and the region outside the hit-region is at least partially transparent.

The method may have one or more of the following features (or any combination thereof). The transparency information and the window region information may be received via an application programming interface (API). The window region may define a shape of the hit-region. In some examples, the shape of the hit-region is rectangular. The filter may include an arrangement of data adjusters that correspond to an arrangement of pixels of the original frame. The application may include a remote application, and the window may include a browser window.

According to an aspect, a non-transitory computer-readable medium stores executable instructions that when executed by at least one processor are configured to receive window region information for a window to be rendered from an application, where the window region information defines a first region within the window, receive an original frame of the window rendered by the application, modify the original frame to create a modified frame based on the window region information such that the first region meets a first threshold level of transparency and a second region meets a second threshold level of transparency, where the second region is separate from the first region, and provide a display of the window with the modified frame such that the first region is at least partially visible to a user and the second region at least partially transparent.

The non-transitory computer-readable medium may have one or more of the following features (or any combination thereof). The executable instructions may be configured to adjust a transparency of the first region upon detection of an input event on the second region including removing the first threshold level of transparency constraint such that the first region is completely or substantially transparent. The executable instructions to modify the original frame to create the modified frame may be configured to generate a filter based on the window region information, and composite the modified frame by applying the filter to the original frame. The executable instructions to generate the filter may be implemented on a browser executed by a computer processing unit (CPU), and the executable instructions to composite the modified frame may be implemented by a graphical processing unit (GPU). The executable instructions may be configured to receive transparency information of the window. The transparency information may include a transparency attribute. The transparency attribute may include a first value or a second value. The first value may indicate that transparency is enabled for the window. The second value may indicate that transparency is not enabled for the window.

DETAILED DESCRIPTION

Figure 1:
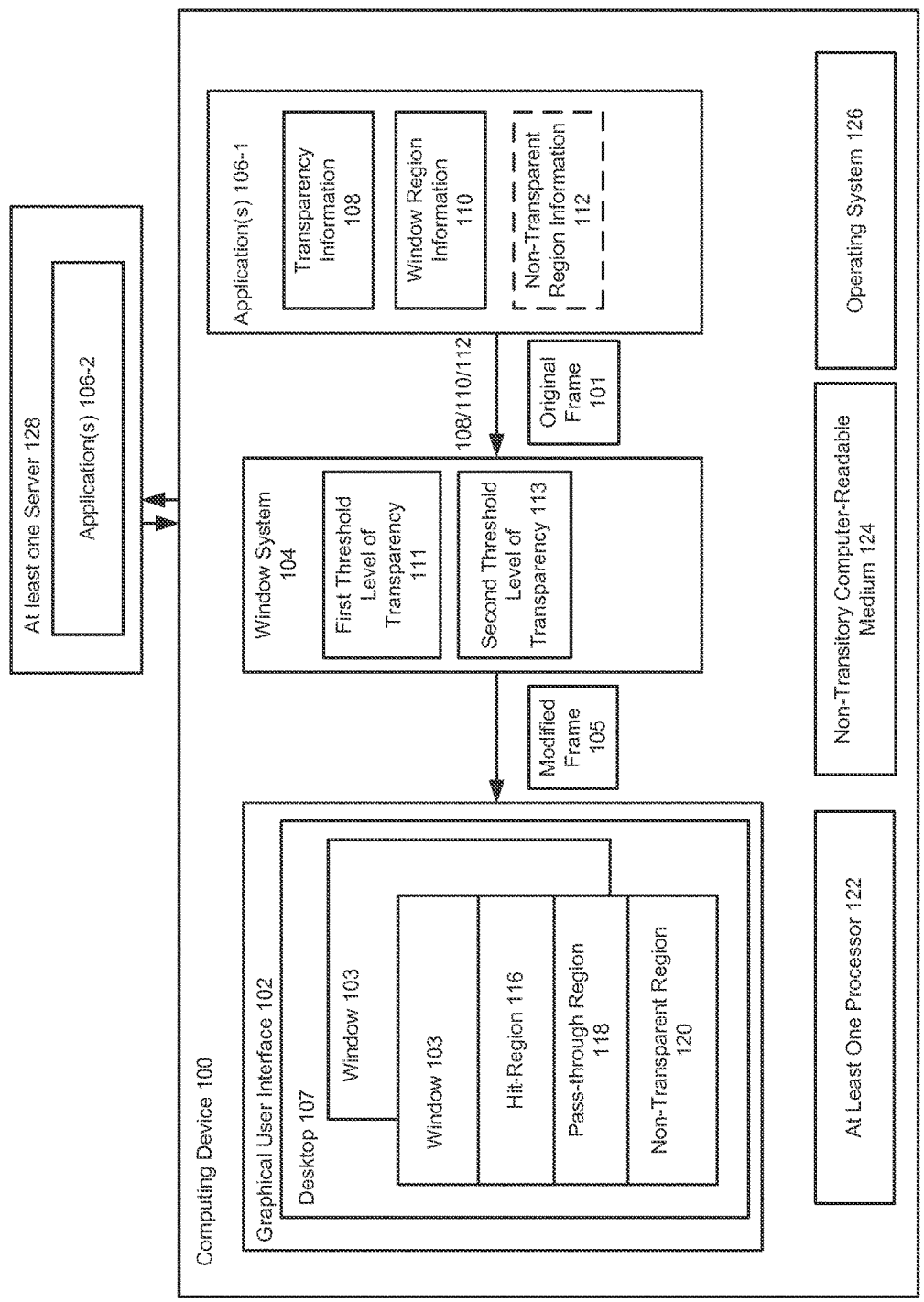
FIG. 1 illustrates a computing device for modifying a transparency of at least a portion of a window according to an embodiment.

Devices, systems and methods are provided that secure a window system supporting window transparency against attacks such as click-jacking attacks and/or click through attacks. For click-jacking attacks, by creating a completely transparent window, an application can hi-jack input events that target an underlying visible window. For click-through attacks, by creating an opaque window that allows input events to pass-through, an application may be able to fool the user into clicking on this opaque window (e.g., "click here for pictures of kittens") such that the click event passes-through to an underlying window. In order to prevent (or decrease) these types of attacks (as well as other types of attacks caused by allowing transparent windows), the window system may require an application to specify whether transparency is enabled for the window and to define which region of the window is a hit-region or a pass-through region. The hit-region may be an area within the window that receives an input event. The pass-through region may be an area that passes-through the input event to an underlying window or the desktop.

The window system may ensure a first level of transparency for the hit-region such that the hit-region of the window is at least partially visible (e.g., not fully opaque). Also, the window system may ensure a second level of transparency for areas outside of the hit-region (e.g., the pass-through region). The first and second levels of transparency may be considered opacity restrictions or constraints that place restrictions on the opacity of window regions. In some examples, the second level of transparency may ensure that the pass-through region is completely or substantially transparent. In some examples, the second level of transparency may ensure that the pass-through region has some level of transparency such that the pass-through region is not completely opaque. As a result, an attacker may be prevented from placing a completely transparent window on top of an existing window, thereby mitigating the risk of click-jacking attacks. Also, an attacker may be prevent from placing a completely opaque pass-through window, thereby mitigating the risk of click-through attacks. Furthermore, the design of the window system may enforce the opacity restrictions on the hit-region and the pass-through region without requiring expensive read-back or processing of textures on the graphics processing unit (GPU) to generate the hit-region.

Furthermore, in some examples, in order to facilitate animation of the window, the window system may dynamically adjust the transparency of the hit-region of the window displayed on the graphical user interface upon detection of an input event outside the hit-region such that the hit-region is changed from being at least partially visible to completely or substantially transparent. The application of the first threshold level of transparency can be adjusted by the window system for the duration of the specific input interactions on the region outside the hit-region to allow flexibility to perform animations on the part of the application. Also, in some examples, the application may request the hit-region to be fully or substantially transparent during a short period of time in order to perform animations while blocking all input events on the hit-region during that period of time. These and other features are further explained with reference to the figures.

FIG. 1 illustrates a computing device 100 for modifying a transparency of at least a portion of a window 103 according to an embodiment. The computing device 100 may be any type of computing device having at least one processor 122, a non-transitory computer-readable medium 124, and an operating system 126. In some examples, the computing device 100 may be a personal computer, laptop computer, smartphone, tablet, television with one or more processors, or gaming console.

The non-transitory computer-readable medium 124 may include one or more non-volatile memories, including, by way of example, semiconductor memory devices, e.g., EPROM, EEPROM, and flash memory devices; magnetic disks, e.g., internal hard disks or removable disks, magneto optical disks, and CD ROM and DVD-ROM disks. The at least one processor 122 may include one or more computer processing units (CPUs) such as any type of general purpose computing circuitry or special purpose logic circuitry, e.g., an FPGA (field programmable gate array) or an ASIC (application specific integrated circuit). Also, the at least one processor 122 may include one or more processors coupled to a semiconductor substrate. The operating system 126 may include virtually any operating system or other platform on which virtually any application 106 may execute. For example, the operating system 126 may include operating systems such as the Windows operating system, Mac OS, or Linux, and may include mobile platforms such as Android, Symbian, or iPhone OS, to name a few examples. In other examples, the operating system 126 may include a browser-based operating system. The type of operating system 126 may vary depending on the specific implementation of the computing device 100.

The computing device 100 may be associated with one or more applications 106. The applications 106 may be any type of applications generally associated with the computing device 100 that provides one or more windows 103 on a graphical user interface 102. In some examples, the applications 106 may include native applications 106-1 executing on the operating system 126 or remote applications 106-2 executing on at least one server 128, or a combination of native applications 106-1 and remote applications 106-2. The native applications 106-1 may include programs, files, document/image/video processing applications, web browsers, and/or generally any type of software application executable on the operating system 126. Each native application 106-1 may be configured to render a window 103 on a desktop 107 of the graphical user interface 102 so that a user may interact with the application 106-1.

In other examples, the computing device 100 may provide the remote applications 106-2 (e.g., web applications) executing on the at least one server 128. For example, the computing device 100 may be communicatively linked to the at least one server 128 via a network such as any type of private or public network. The at least one server 128 may include one or more servers configured as a cloud computing service configured to provide instances of the remote applications 106-2 through windows 103 of opened web browsers. Each remote application 106-2 may be configured to render a window 103 (e.g., a browser window) on the desktop 107 of the graphical user interface 102 so that a user may interact with the application 106-2. The graphical user interface 102 may include one or more windows 103 corresponding to one or more instances of the remote applications 106-2 executing on the at least one server 128. Throughout this disclosure, the term application 106 may refer either to the native application 106-1 or the remote application 106-2 unless the disclosure specifically refers to one or the other. Also, term applications 106 may encompass the native applications 106-1 or the remote applications 106-2 or a combination of the native applications 106-1 and the remote applications 106-2 unless the disclosure specifically refers to one or the other.

The window system 104 may be configured to control the placement and appearance of the windows 103 rendered from the applications 106 within the graphical user interface 102. For example, the computing device 100 may have multiple open windows 103 which may be displayed in a number of various geometrical arrangements. In some examples, the windows 103 may be displayed on the graphical user interface 102 in a partially overlapping fashion. However, the windows 103 may be displayed in any type of arrangement (overlapping or non-overlapping). Also, the user may be able to manipulate the arrangement of the windows 103 by changing the size and location of the windows 103 within the desktop 107 of the graphical user interface 102.

The graphical user interface 102 may be any type of windowing system that implements windows, icons, menus, and/or pointers for a user interface. The desktop 107 may be a plane of the graphical user interface 102 that serves as a background for the windows 103. In some examples, the desktop 107 may be a virtual desktop provided by the cloud computing service of the at least one server 128. The window system 104 may operate in conjunction with the graphical user interface 102 for providing the required functionality for supporting the underlying graphics hardware, pointing devices, keyboards, touchscreens, and/or other functionalities capable of providing or receiving input events. In some examples, the window system 104 in conjunction with the graphical user interface 102 may perform additional processing on the windows 103 by applying two-dimensional and three-dimensional animated effects such as blending, fading, scaling, rotation, duplication, bending and contortion, shuffling, blurring, and/or translating the windows 103 into one or more displays.

The window system 104 may be configured to support window transparency. Window transparency may be a desktop enhancement that renders open windows 103 with a level of transparency such that one or more windows may be at least partially seen-through (or transparent). Window transparency may allow a user to monitor multiple open windows 103 since the user is able to view multiple overlapping windows 103 at once.

The window 103 may be a visual area providing a graphical display on the desktop 107 of the graphical user interface 102. Generally, the window 103 may represent output from the application 106. The window 103 may include a user interface such that the window 103 can accept user input in the form of input events such as click events, mouse events, touchscreen events, and/or keyboard events, etc. The window 103 may include other graphical objects such as a menu-bar, toolbars, controls, icons, etc. In some examples, the window 103 may be rectangular in shape. In other examples, the window 103 may be non-rectangular. For example, the window 103 may have one or more curved portions and/or one or more bent portions. In some examples, the window 103 may include a shape of a circle, ellipse, polygon, and/or any combination of non-rectangular shapes.

In some examples, the window transparency may be controlled by the application 106. The application 106 may indicate that the window 103 rendered by the application 106 is enabled with window transparency. For example, the application 106 may specify transparency information 108 identifying that transparency is enabled. In some examples, the transparency information 108 may provide an attribute field that indicates whether or not transparency is enabled. For instance, the transparency information 108 may indicate that transparency is enabled or indicate that transparency is not enabled. In some examples, the application 106 may specify the transparency information 108 within one or more files of the application 106. In some examples, the remote application 106-2 may specify the enablement of transparency via an application programming interface (API) for creating a window, e.g., by enabling an attribute corresponding to the window transparency. In some examples, the transparency attribute may include a first value indicating that transparency is enabled or a second value indicating that transparency is not enabled. If the application 106 does not provide the transparency information 108 or indicates that transparency is not enabled within the transparency information 108, the window system 104 may composite a completely opaque or substantially opaque window as the window 103 displayed on the graphical user interface 102.

In some examples, if the application 106 specifies that transparency is enabled within the transparency information 108, the application 106 may also define window region information 110 that identifies a region within the window 103 to be rendered. The region may be smaller than (or may be a subset of) an overall size of the window 103. In some examples, the region may be the same as the overall size of the window 103. In some examples, the region defined by the window region information 110 may include multiple distinct sub-regions within the window 103. In some examples, the region defined by the window region information 110 may be a single region. The window region information 110 may define the size or shape of the region. The application 106 may define the window region information 110 within one or more files associated with the application 106. In some examples, the remote application 106-2 may specify the window region information 110 via an API attribute related to the method of creating windows 103.

In some examples, the window region information 110 may define a size or shape of a hit-region 116 within the window 103. In some examples, the window system 104 is designed to ensure that the rendered and hit-region match. The hit-region 116 may be an area within the window 103 that accepts input events (e.g., click events, mouse events, touchscreen events, and/or keyboard events, etc.). The hit-region 116 may be smaller than an overall size of the window 103. In other examples, the hit-region 116 may be the same as the overall size of the window 103. In some examples, the hit-region 116 defined by the window region information 110 may include multiple distinct sub-hit-regions or a single region.

The hit-region 116 may be rectangular. The shape or size of the hit-region 116 may be defined by a width and height. Also, the window region information 110 may define information that indicates where the hit-region 116 is located with respect to the overall window 103. The window region information 110 may provide one or more coordinates of the hit-region 116, which relate to where the hit-region 116 is located within the window 103. The coordinates of the hit-region 116 may be referenced from a top, bottom, left side, and/or right side of the window 103. In some examples, the hit-region 116 may be defined using y-x banded rectangles. In some examples, the hit-region 116 may be a non-rectangular shape. For example, the hit-region 116 may include one or more curved regions which may be defined in terms of lines, arcs, and other elements expressing non-rectangular shapes. In some examples, the non-rectangular shape of the hit-region 116 may be defined in terms of a path describing a shape. The path may include various straight and/or curved elements. Input events may be delivered to the window 103 if they fall within the configured hit-region 116 as specified by the window region information 110. The area outside the hit-region 116 is the pass-through region 118 which passes-through input events to an underlying window 103 or the desktop 107.

In other examples, the window region information 110 may define a shape of the pass-through region 118. For example, instead of defining the hit-region 116 within the window region information 110, the window region information 110 defines the pass-through region 118. In other examples, the window region information 110 defines both the pass-through region 118 and the hit-region 116. The pass-through region 118 may be an area within the window 103 that passes-through input events to an underlying window 103 or the desktop 107. In other words, the pass-through region 118 may be an area of the window 103 that does not accept input events, but rather passes them through to the window 103.

Similar to the hit-region 116, the pass-through region 118 may be smaller than an overall size of the window 103 or the same as the overall size of the window 103. The pass-through region 118 defined by the window region information 110 may include multiple distinct sub-hit-regions or a single region. The pass-through region 118 and the hit-region 116 may be exclusive (e.g., separate, non-overlapping areas). The pass-through region 118 may be rectangular or non-rectangular. The shape or size of the pass-through region 118 may be defined by a width and height. Also, the window region information 110 may define information that indicates where the pass-through region 118 is located with respect to the overall window 103. For example, the window region information 110 may provide one or more coordinates of the pass-through region 118, which relate to where the pass-through region 118 is located within the window 103. The coordinates of the pass-through region 118 may be referenced from a top, bottom, left side, and/or right side of the window 103. In some examples, the pass-through region 118 may be defined using y-x banded rectangles.

The window system 104 ensures at least one of a first threshold level of transparency 111 and a second threshold level of transparency 113 for the hit-region 116 and/or the pass-through region 118 of the window 103 rendered by the application 106. For example, the window system 104 may pre-define the first threshold level of transparency 111 for the hit-region 116 of the window 103. The first threshold level of transparency 111 may be a pre-defined level of transparency between a completely transparent window (e.g., 100% transparent) and a completely opaque window (e.g., 0% transparent). The first threshold level of transparency 111 may be a pre-defined level such that the hit-region 116 is not completely transparent or invisible. The first threshold level of transparency 111 may be a pre-defined level such that the hit-region 116 is at least minimally visible to the user. The first threshold level of transparency 111 may be a constraint that limits the range of transparency to a pre-define range. The pre-defined range may be 0%-90% transparent (e.g., 10%-100% opaque). In other examples, the pre-defined range may be 0%-85% transparent, 0%-80% transparent, or 0%-75% transparent.

The window system 104 may define the second threshold level of transparency 113 for the pass-through region 118. In terms of transparency, the second threshold level of transparency 113 may be higher than the first threshold level of transparency 113. In some examples, the second threshold level of transparency 113 may be completely or substantially transparent. For example, the second threshold level of transparency 113 may be a pre-defined level of transparency such that the pass-through region 118 is completely or substantially transparent. In other examples, the second threshold level of transparency 113 may be a pre-defined level of transparency between a completely transparent window (e.g., 100% transparent) and a completely opaque window (e.g., 0% transparent). The second threshold level of transparency 113 may be a pre-defined level such that the pass-through region 118 is not completely opaque (e.g., not completely solid). The second threshold level of transparency 113 may be a pre-defined level such that the pass-through region 118 is at least minimally transparent to the user such that the user can at least partially notice an underlying window 103 or the desktop 107. The second threshold level of transparency 113 may be a constraint that limits the range of transparency to a pre-defined range. In some examples, the pre-defined range may be 10%-100% transparent (e.g., 0%-90% opaque). In other examples, the pre-defined range may be 5%-100% transparent, 15%-100% transparent, or 20%-100% transparent.

When creating the window 103, the window system 104 may be configured to receive the window region information 110 and the transparency information 108 for the window 103 rendered by the application 106. Also, the window system 104 may receive an original frame 101 of the window 103 rendered by the application 106. The original frame 101 may include a single frame or multiple frames. The original frame 101 of the window 103 may represent the original content of the window 103 rendered from the application 106 to be processed by the window system 104. The original frame 101 may include an arrangement of pixels, where each pixel includes a pixel value. In some examples, the original frame 101 may be an image or represent the imagery of the window 103.

The window system 104 may be configured to generate a modified frame 105 of the window 103 by modifying the original frame 101 of the window 103 rendered from the application 106 such that the hit-region 116 of the window 103 meets the first threshold level of transparency 111 and/or the pass-through region 118 meet the second threshold level of transparency 113. The modified frame 105 may include one or more frames. The modified frame 105 may include an arrangement of pixels, where each pixel includes a pixel value. The window system 104 may be configured to modify the original frame 101 by adjusting at least a portion of the pixel values corresponding to the hit-region 116 and/or the pass-through region 118 such that the pixel values of the hit-region 116 meet the first threshold level of transparency 111 and/or the pixel values of the pass-through region 118 meet the second threshold level of transparency 113. As a result, the modified frame 105 may include the adjusted pixel values. Further details of generating the modified frame 105 are explained with reference to FIG. 2.

The window system 104 may provide the window 103 having the modified frame 105 to the graphical user interface 102 for display. Because the window system 104 forces a certain level of transparency for the hit-region 116 of the window 103, the hit-region 116 will be at least minimally visible to the user. As a result, attackers cannot create (or would be difficult to create) a completely transparent window 103 in order to deceivingly capture input events. Also, because the window system 104 forces the pass-through region 118 to be fully transparent (or at least partially transparent), the pass-through region 118 is not completely solid or opaque such that an underlying window 103 or the desktop 107 may be still visible to the user. In this situation, if an attacker places a user-input capturing window behind the pass-through region 118 of the window 103, the attacker's window may be still visible to the user, thereby minimizing the risk that the user will be fooled into providing an input event over the pass-through region 118.

In some examples, the window system 104 may receive a request for a full transparency range from the application 106 such that the window 103 is displayed without the constraints of the first threshold level of transparency 111 and/or the second threshold level of transparency 113. The full transparency range may be completely (or substantially) transparent to completely (or substantially) opaque. In some examples, the application 106 may transmit the request to the window system 104 when performing animation such as fade-in or fade-out animations. In some examples, the request for the full transparency range may be associated with a defined period of time such that the full transparency mode is enabled for the defined period of time. After expiration of the defined period of time, the first threshold level of transparency 111 may be re-applied to the hit-region 116 of the window 103. In some examples, the application 106 may define the request for the full transparency range and the period of time using an API. When the window 103 is in the full transparency mode, the window 103 may not receive input events. If the window 103 receives an input event during the full transparency mode, the input event is ignored or disregarded, and the window 103 may drop out of the full transparency mode (e.g., the first level of transparency 111 and/or the second threshold level of transparency 113 may be re-applied).

In some examples, the window system 104 may dynamically change the level of transparency (from a first value or level to a second value or level) of the hit-region 116 of the displayed window 103 upon detection of an input event (e.g., cursor) outside the hit-region 116 of the window 103. For example, the window system 104 may receive an indication that a cursor of a pointing device is within an area of the window 103 outside of the hit-region 116 of the window 103. In some examples, the window system 104 may receive an indication that the cursor is within the pass-through region 118 of the window 103. Upon detection of the input event outside the hit-region 116 of the window 103, the window system 104 may be configured to adjust the transparency of the hit-region 116 to allow it to be completely or substantially transparent. For example, upon detection of the input event outside the hit-region 116, the window system 104 may be configured to disregard the first threshold level of transparency 111 (which limits the hit-region 116 to be at least partially visible) and render the hit-region 116 to be completely or substantially transparent. In this situation, the window system 104 may be configured to perform animation on the window 103. For instance, in some examples, the performance of animation on a partially visible hit-region 116 may be difficult. As such, the window system 104 may alleviate this difficulty by adjusting the hit-region 116 of the window 103 to be completely or substantially transparent upon detection of the input event outside the hit-region 116 while at the same time reducing the possibility of click-jacking attacks or click-through attacks because the cursor is not over the hit-region 116 when the hit-region 116 becomes completely or substantially transparent.

Then, upon detection of an input event within the hit-region 116 (e.g., the cursor is located within the hit-region 116), the window system 104 may be configured adjust the transparency level of the hit-region 116 such that the completely or substantially transparent hit-region 116 is adjusted to meet the first threshold level of transparency 111, thereby providing the hit-region 116 that is at least partially visible. As such, depending on what area of the window 103 senses an input event, the window system 104 may or may not apply the first threshold level of transparency 111 to the hit-region 116. If the window system 104 receives an indication of an input event outside the hit-region 116, the window system 104 does not apply the first threshold level of transparency 111 to the hit-region 116. However, if the window system 104 does not receive an indication of an input event outside the hit-region 116 (or receives an indication of an input event on the hit-region 116), the window system 104 may apply the first threshold level of transparency 11 to the hit-region 116.

Furthermore, in the context of facilitating animation on the window 103, the window transparency features embodied by the computing device 100 may also allow the applications 106 to specify non-transparent region information 112. The non-transparent region information 112 may indicate a non-transparent region 120 of the window 103 that will be rendered completely or substantially non-transparent (e.g., completely or substantially opaque). In some examples, the non-transparent region 120 may include one or more separate regions within the window 103. In other examples, the non-transparent region 120 may include a single region within the window 103. In some examples, the non-transparent region 120, the pass-through region 118, and the hit-region 116 may be exclusive from one another (e.g., separate, non-overlapping areas). In some examples, the non-transparent region information 112 may be included within the window region information 110 that specifies the hit-region 216 or the pass-through region 218. In other examples, the non-transparent region information 112 may be specified in a location different from the window region information 110. The application 106 may define the non-transparent region information 112 within one or more files associated with the application 106. Also, the remote application 106-2 may specify the non-transparent region information 112 via an API attribute related to the method of creating windows 103.

The size or shape of the non-transparent region information 112 may be defined by a width and a height. Also, the non-transparent region information 112 may define information that indicates where the non-transparent region 120 is located with respect to the overall window 103. For example, the non-transparent region information 112 may provide one or more coordinates of the non-transparent region 120, which relate to where the non-transparent region 120 is located within the window 103. The coordinates of the non-transparent region 120 may be referenced from a top, bottom, left side, and/or right side of the window 103. In some examples, the non-transparent region 120 may be defined using y-x banded rectangles. In some examples, the non-transparent region 120 may be a non-rectangular shape. For example, the non-transparent region 120 may include one or more curved regions which may be defined in terms of lines, arcs, and other elements expressing non-rectangular shapes.

Upon detection of the input event on the non-transparent region 120 of the window 103, the window system 104 may be configured to adjust the transparency of the hit-region 216 to be completely or substantially transparent. In some examples, upon detection of the input event on the non-transparent region 120, the window system 104 may be configured to disregard the first threshold level of transparency 111 (which limits the hit-region 116 to be at least partially visible) and render the hit-region 116 to be completely or substantially transparent in the same manner described above. Also, upon detection of an input event within the hit-region 116 (e.g., the cursor is located within the hit-region 116), the window system 104 may be configured adjust the transparency level of the hit-region 116 such that the completely or substantially transparent hit-region 116 is adjusted to meet the first threshold level of transparency 111, thereby providing an at least partially visible hit-region 116. As such, depending on whether the window system 104 senses an input event on the non-transparent region 120, the window system 104 may or may not apply the first threshold level of transparency 111 to the hit-region 116.

Figure 2:
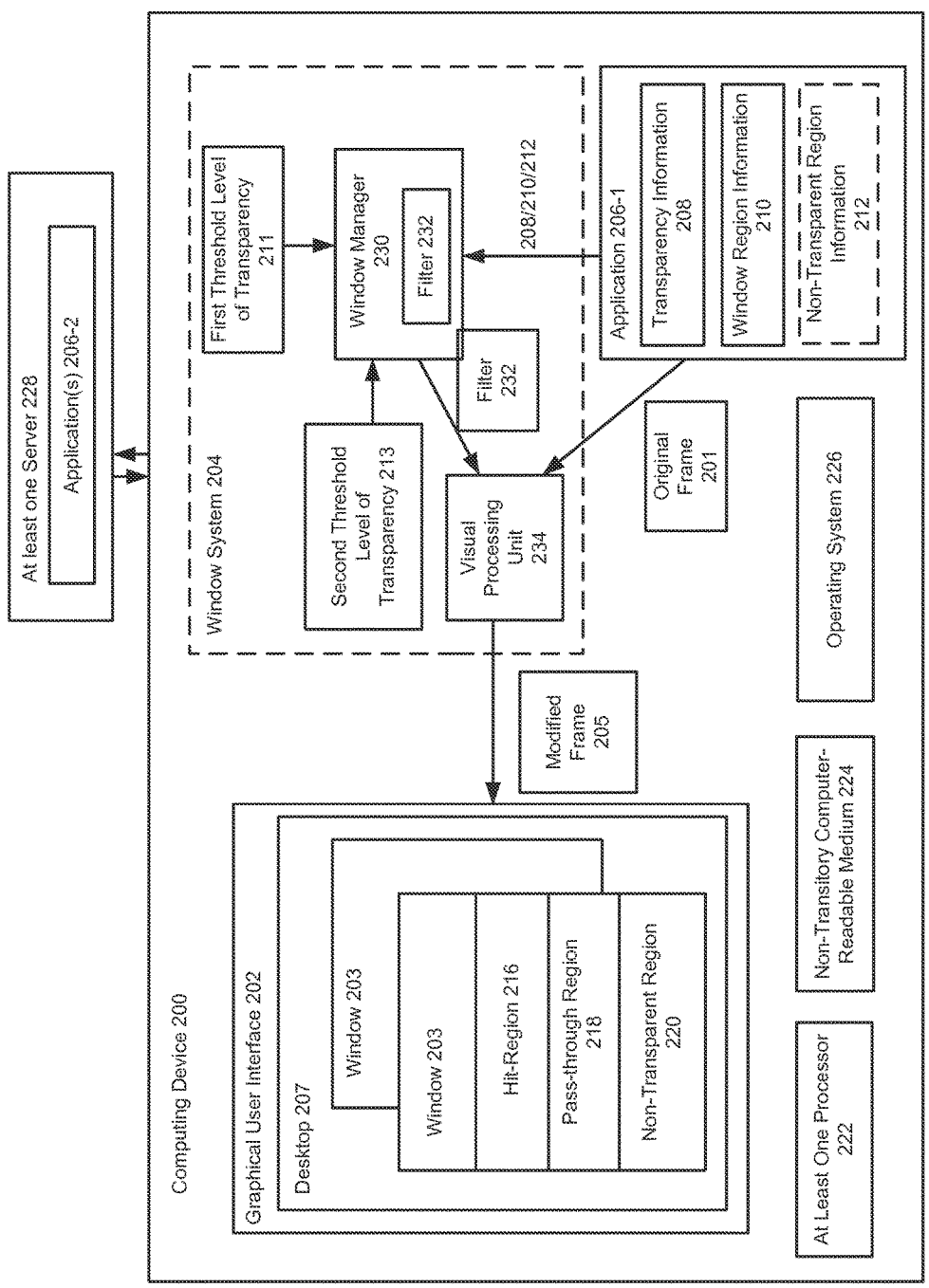
FIG. 2 illustrates a computing device for modifying a transparency of at least a portion of a window according to another embodiment.

FIG. 2 illustrates a computing device 200 for modifying a transparency of at least a portion of a window 203 according to another embodiment. The computing device 200 of FIG. 2 may include the same components of the computing device 100 of FIG. 1 except that the computing device 200 illustrates the components of the window system 204. For example, the computing device 200 may include at least one processor 222, a non-transitory computer readable medium 224, an operating system 226, a graphical user interface 202 having a desktop 207 for the display of one or more windows 203, and a window system 204. Also, the computing device 200 may be associated with one or more applications 206 (e.g., native applications 206-1, remote applications 206-2 executing on at least one server 228). Because these components (and other components of FIG. 2) were previously described with reference to FIG. 1, their details will be omitted for the sake of brevity except for features related to the description of FIG. 2.

Referring to FIG. 2, the window system 204 may include a window manager 230 and a visual processing unit 234. In some examples, the window manager 230 may be configured as, or included as part of, a browser. In some examples, the window manager 230 may be implemented by the CPU of the computing device 200 (e.g., the at least one processor 222). In some examples, the visual processing unit 234 may configured as a graphical processing unit (GPU) which may be a separate processing logic circuit from the window manager 230. The GPU may be a specialized electronic circuit designed to manipulate and alter memory to accelerate the creation of frames (e.g., modified frame 205) in a frame buffer intended for output to the graphical user interface 202. In some examples, the visual processing unit 234 may be configured as a compositor. The compositor may be configured to perform compositing techniques for combining the original frame 201 rendered from the application 206 with a filter 232 generated by the window manager 230 to create the modified frame 205 meeting the constraint of the first threshold level of transparency 211 for the hit-region 216 and the constraint of the second threshold level of transparency 213 for the pass-through region 218.

As indicated above, the application 206 may be configured to set transparency information 208, and window region information 210, as previously discussed with reference to FIG. 1. Also, the application 206 may be configured to set non-transparent region information 212, as previously discussed with reference to FIG. 1. The window manager 230 may be configured to receive the window region information 210 from the application 206. In some examples, the window region information 210 only defines the hit-region 216. As such, the window manager 230 may be configured to derive the pass-through region 218 based on the defined hit-region 216 by identifying areas outside the hit-region 216 as the pass-through region 218. In other examples, the window region information 210 only defines the pass-through region 218. In this example, the window manager 230 may be configured to derive the hit-region 216 based on the defined pass-through region 218 by identifying areas outside the pass-through region 218 as the hit-region 216. In other examples, the window region information 210 defines both the pass-through region 218 and the hit-region 216. Furthermore, in some examples, the window manager 230 configured as the browser may receive the window region information 210 via an API.

The window manager 230 may be configured to generate a filter 232 based on the window region information 210, as well as the first threshold level of transparency 211 and/or the second threshold level of transparency 213. The filter 232 may be data that is configured to alter pixel values for the original frame 201 of the window 203. In some examples, the filter 232 may be configured such that the filter 232 can specify the full range of opacities in order to vary the thresholding to create the impression of round windows. In some examples, the filter 232 may represent an arrangement of data adjusters (e.g., bit operators) that correspond the arrangement of pixels of the original frame 201. Application of the filter 232 to the original frame 201 provide a modified frame 205 that corresponds to the desired level of transparency for the hit-region 216, the pass-through region 218, and/or the non-transparent region 220 of the window 203 to be rendered by the visual processing unit 234.

For example, if the transparency information 208 indicates that transparency of the window 103 is not enabled, the window manager 230 is configured to generate the filter 232 to provide an opaque window 203 (or substantially opaque window 203) when combined with the original frame 101 rendered from the application 206. However, if the transparency information 208 indicates that the transparency of the window 203 is enabled, the window manager 230 identifies which regions of the window 203 are the hit-region 216, the pass-through region 218, and/or the non-transparent region 220 based on the window region information 210 and/or the non-transparent region information 212. Then, the window manager 230 is configured to generate the filter 232 that meets the constraint specified in the first threshold level of transparency 211 for the hit-region 216, the second threshold level of transparency 213 for the pass-through region 218, and/or the level of transparency (e.g., completely or substantially non-transparent) for the non-transparent region 220. The window manager 230 is configured to send the filter 232 to the visual processing unit 234.

The visual processing unit 234 is configured to generate the modified frame 205 of the window 203 rendered from the application 206 by applying the filter 232 to the original frame 201 such that the hit-region 216 meets the first threshold level of transparency 211 and the pass-through region 218 meet the second threshold level of transparency 213. In some examples, the visual processing unit 234 may be configured to combine the filter 232 with the original frame 201 according to image compositing techniques. Then, the visual processing unit 234 may be configured to provide the window 203 having the modified frame 205 to the graphical user interface 202 for display in a manner that forces the hit-region 216 to be at least partially visible to the user (e.g., not completely transparent) and the pass-through region 218 of the window 203 to be completely transparent or less than completely opaque. Also, the visual processing unit 234 may be configured to apply the filter 232 to the original frame 201 such that the non-transparent region is completely or substantially opaque. In some examples, the visual processing unit 234 is configured to de-activate the opaque background typically applied to the window 203, and instead apply the filter 232 to the original frame 201 to ensure that the modified frame 205 meets the transparency constraints.

The computing device 200 may reduce the processing and complexity of processing windows 203 having transparency. In some conventional systems, applications do not indicate which areas are hit-region 216 or pass-through region 218. As such, these systems may evaluate each pixel of the window 203 to derive the level of transparency for each region within the window 103 (e.g., how opaque each region in the window is) which increases the computational complexity of the window system. In addition, this determination is relatively difficult because the rendering of windows 103 is most modern systems is GPU accelerated which means that the frames are not stored in the main memory of the computing device, but rather on the GPU. As such, within these systems, it is relatively difficult to perform input hit testing to determine whether certain areas of the window are pass-through areas.

As such, instead of attempting to derive the hit-region 216 of the window 203 from an evaluation of the pixel values of the frame of the window 203, the computing device 200 may require that the application 206 define the hit-region 216 (or the pass-through region 218), and the window system 204 forces the transparency of the hit-region 216 to meet the first threshold level of transparency 211 and/or forces the transparency of the pass-through region 218 to meet the second threshold level of transparency 213.

Figure 3:
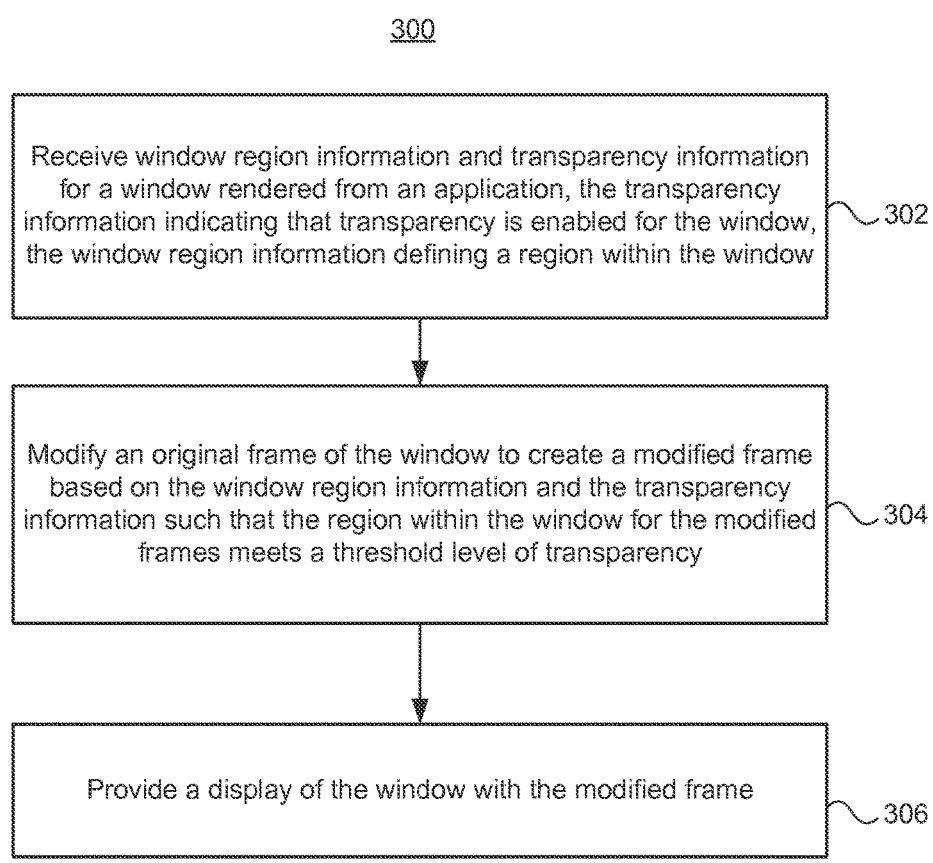
FIG. 3 illustrates a flowchart depicting example operations of the computing device of FIG. 1 and/or the computing device of FIG. 2 according to an embodiment.

FIG. 3 illustrates a flowchart 300 depicting example operations of the computing device 100 of FIG. 1 and/or the computing device 200 of FIG. 2 according to an embodiment. Although FIG. 3 is illustrated as a sequential, ordered listing of operations, it will be appreciated that some or all of the operations may occur in a different order, or in parallel, or iteratively, or may overlap in time.

Window region information and transparency information for a window rendered from an application may be received, where the transparency information indicates that transparency is enabled for the window, and the window region information defines a region within the window (302). In some examples, the window region information, the transparency information, and the window may be the window region information 110/210, the transparency information 108/208, and the window 103/203, respectively, as described with reference to FIGS. 1-2. In some examples, the region defined by the window region information may include the hit-region 116/216, the pass-through region 118/218, and/or the non-transparent region 120/220 as described with reference to FIGS. 1-2. The transparency information and the window information may be received from the application via an API. In some examples, a window system receives the window region information and the transparency information from the application. The window system may be the window system 104/204 as described with reference to FIG. 102. In some examples, the window system may include a window manager and a visual processing unit. The window manager and the visual processing unit may be the window manager 230 and the visual processing unit 234, respectively, as described with reference to FIG. 2. The window manager may be implemented within the web browser executed by a CPU of the computing device. In some examples, the visual processing unit may be implemented within the GPU of the computing device.

An original frame of the window may be modified to create a modified frame based on the window region information and the transparency information such that the region within the window for the modified frames meets a threshold level of transparency (304). The original frame and the modified frame may be the original frame 101/201 and the modified frame 105/205, respectively, as described in FIGS. 1-2. Also, the threshold level of transparency may include the first threshold level of transparency 111/211 and/or the second threshold level of transparency 113/213. In some examples, the window system may be configured to modify the original frame of the window to create the modified frame based on the window region information and the transparency information. In some examples, the window manager may be configured to receive the window region information and the transparency information. If the transparency information indicates that transparency is enabled for the window to be rendered, the window manager identifies at least one of the hit-region, the pass-through region, and the non-transparent region within the window. Then, the window manager may be configured to generate a filter that when applied to the original frame of the window will modify the pixel values of the original frame to meet the constraint(s) of the first threshold level of transparency and/or the second threshold level of transparency. The filter may be the filter 232 discussed with reference to FIG. 2. The window manager may be configured to transmit the filter to the visual processing unit. The visual processing unit may be configured to apply the filter to the original frame to create the modified frame meeting the constraint(s) of the first threshold level of transparency and/or the second threshold level of transparency.

A display of the window with the modified frame may be provided (306). In some examples, the window system may be configured to send the window with the modified frame to a graphical user interface. The graphical user interface may be the graphical user interface 102/202 as discussed with reference to FIGS. 1-2. In some examples, the window with the modified frame may be displayed on a desktop such as the desktop 107/207.

Figure 4:
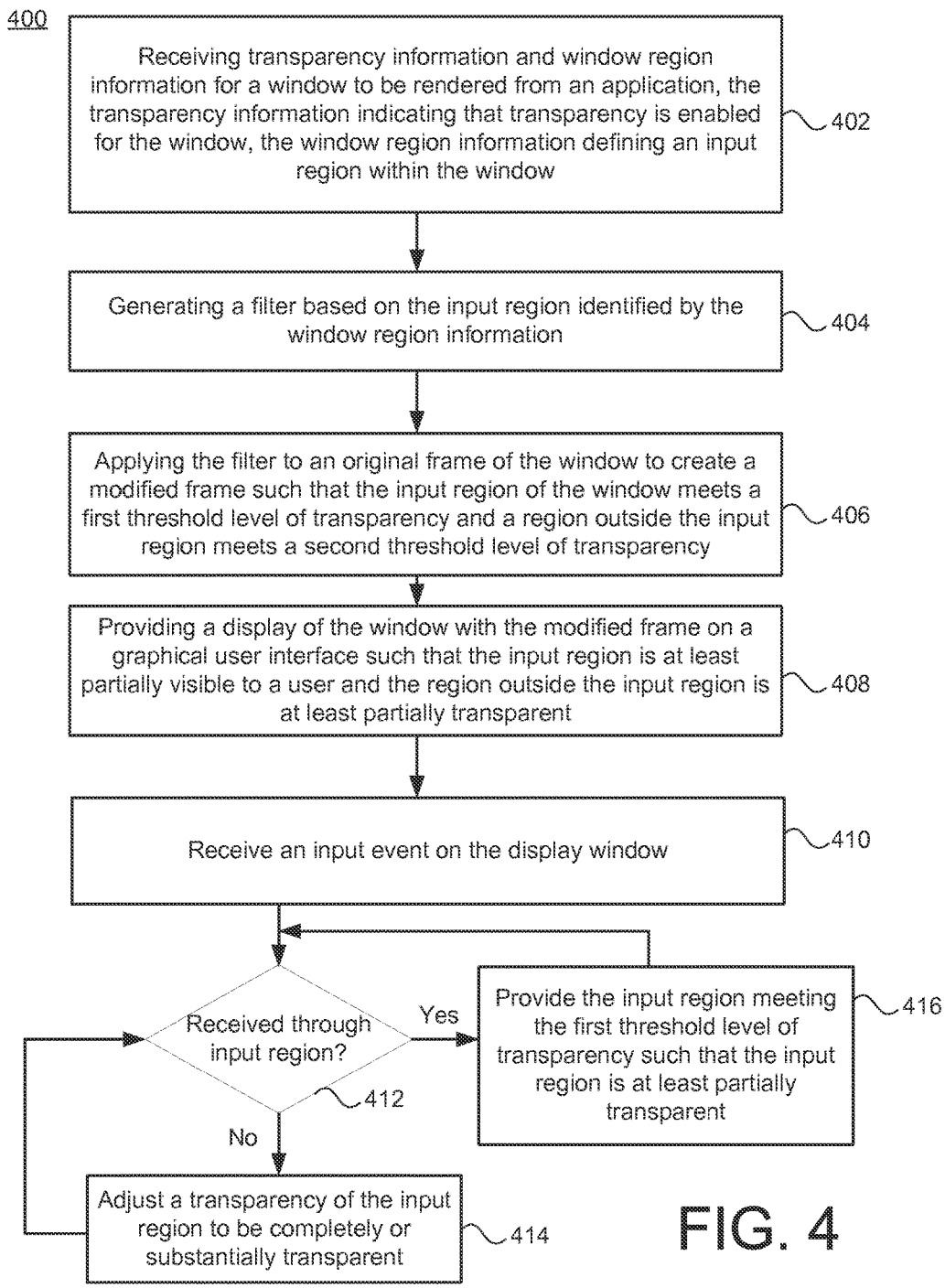
FIG. 4 illustrates a flowchart depicting example operations of the computing device of FIG. 1 and/or the computing device of FIG. 2 according to another embodiment.

FIG. 4 illustrates a flowchart 400 depicting example operations of the computing device 100 of FIG. 1 and/or the computing device 200 of FIG. 2 according to another embodiment. Although FIG. 4 is illustrated as a sequential, ordered listing of operations, it will be appreciated that some or all of the operations may occur in a different order, or in parallel, or iteratively, or may overlap in time.

Transparency information and window region information for a window to be rendered from an application may be received, where the transparency information indicates that transparency is enabled for the window, and the window region information defines a hit-region within the window (402). In some examples, the window region information, the transparency information, and the window may be the window region information 110/210, the transparency information 108/208, and the window 103/203, respectively, as described with reference to FIGS. 1-2. In some examples, the hit-region may include the hit-region 116/216 as discussed with reference to FIGS. 1-2. The transparency information and the window information may be received from the application via an API. In some examples, a window system receives the window region information and the transparency information from the application. The window system may be the window system 104/204 as described with reference to FIG. 102. In some examples, the window system may include a window manager and a visual processing unit. The window manager and the visual processing unit may be the window manager 230 and the visual processing unit 234, respectively, as described with reference to FIG. 2. The window manager may be implemented within the web browser executed by a CPU of the computing device. In some examples, the visual processing unit may be implemented within the GPU of the computing device.

A filter may be generated based on the hit-region identified by the window region information (404). The filter may be the filter 232 discussed with reference to FIG. 2. The window manager may be configured to generate the filter using the information contained in the window region information.

The filter may be applied to an original frame of the window to create a modified frame such that the hit-region of the window meets a first threshold level of transparency and a region outside the hit-region meets a second threshold level of transparency (406). The original frame and the modified frame may be the original frame 101/201 and the modified frame 105/205, respectively, as described in FIGS. 1-2. Also, the region outside the hit-region may include the pass-through region 118/218 as discussed with reference to FIGS. 1-2. Also, the first threshold level of transparency and the second threshold level of transparency may be the first threshold level of transparency 111/211 and the second threshold level of transparency 113/213, respectively, as discussed with reference to FIGS. 1-2. The visual processing unit may be configured to apply the filter to the original frame to create the modified frame meeting the constraint(s) of the first threshold level of transparency and/or the second threshold level of transparency.

A display of the window with the modified frame may be provided on a graphical user interface such that the hit-region is at least partially visible to a user and the region outside the hit-region is at least partially transparent (408). In some examples, the visual processing unit may be configured to send the window with the modified frame to a graphical user interface. The graphical user interface may be the graphical user interface 102/202 as discussed with reference to FIGS. 1-2. In some examples, the window with the modified frame may be displayed on a desktop such as the desktop 107/207.

An input event may be received on the display window (410). For example, an input event may include click events, mouse events, touchscreen events, and/or keyboard events. In some examples, the input event may be the placement of the cursor within an area of the displayed window. In some examples, the user may move the cursor, which results in an input event. The window system may receive notifications of such input events.

A determination is made on whether the input event is received through the hit-region of the window (412). For example, the window system may be configured to determine whether the input event relates to an action on the hit-region of the window or an action outside the hit-region such as the pass-through region or the non-transparent region.

A transparency of the hit-region may be adjusted to be completely or substantially transparent (414). For example, if it is determined that the input event relates to action on a region outside the hit-region (No), a transparency of the hit-region may be adjusted from being at least partially visible to be completely or substantially transparent. In some examples, the window system may be configured to disregard the first threshold level of transparency (which limits the hit-region to be at least partially visible) and render the hit-region to be completely or substantially transparent. In this situation, the window system may be configured to perform animation on the window. For instance, in some examples, the performance of animation on a partially visible hit-region may be difficult. As such, the window system may alleviate this difficulty by adjusting the hit-region to be completely or substantially transparent upon detection of the input event outside the hit-region.

The hit-region meeting the first threshold level of transparency may be provided such that the hit-region is at least partially transparent (416). For example, if it is determined that the input event relates to action on the hit-region (Yes), the transparency of the hit-region may remain the same, e.g., meeting the first threshold level of transparency such that the hit-region is at least partially transparent.

Figure 5:
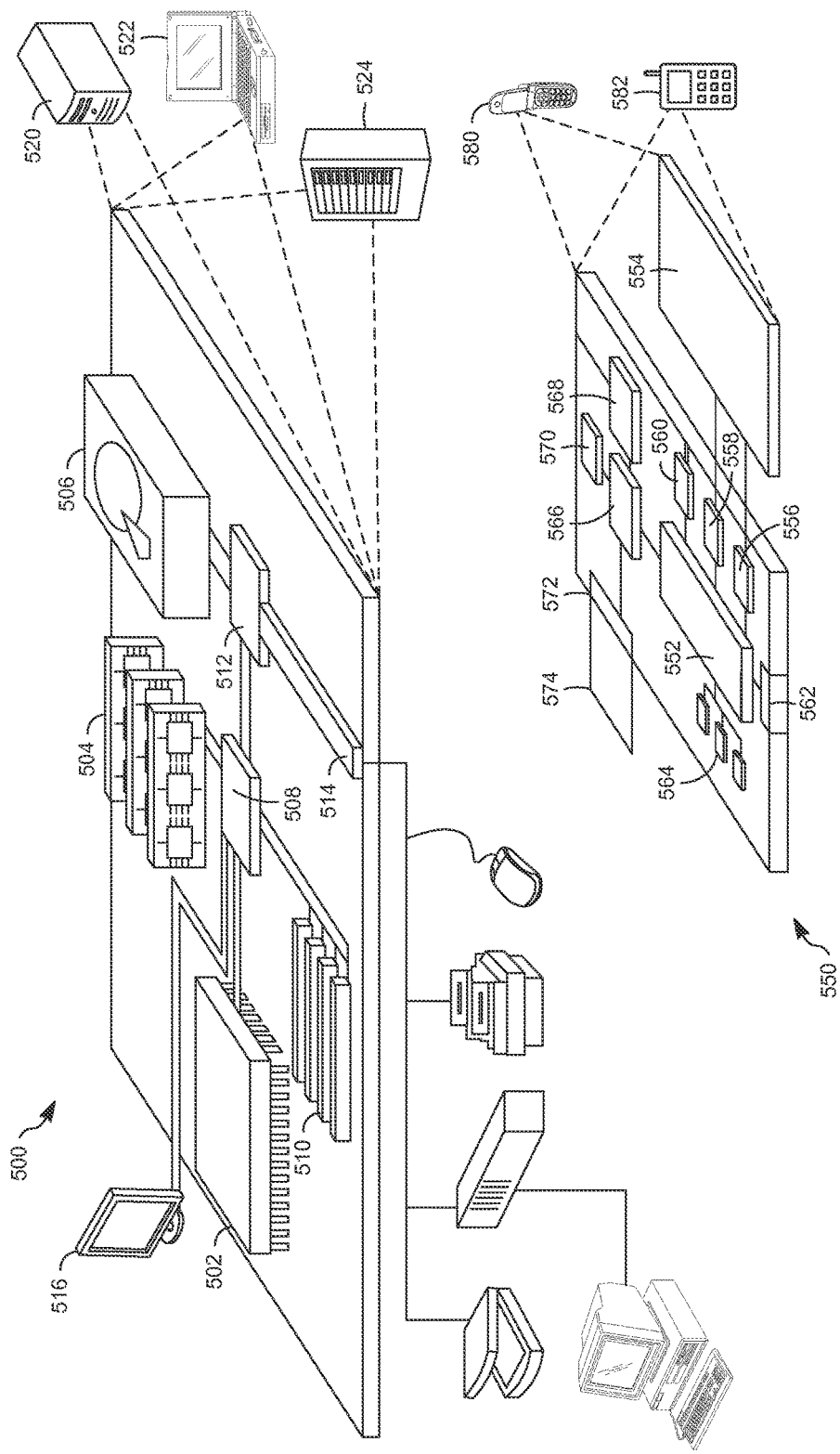
FIG. 5 is a block diagram showing example or representative devices and associated elements that may be used to implement the computing devices and methods of FIGS. 1-4.

FIG. 5 is a block diagram showing example or representative devices and associated elements that may be used to implement the computing devices and methods of FIGS. 1-4. FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI (e.g., the graphical user interface 102) on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "modifying" or "receiving" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A method for rendering a window of an application, the method comprising:
    setting a threshold level of transparency for all applications in a computing device, the threshold level of transparency being independent of the applications and being adjustable to any value below 100% transparency;
    receiving, from a first application of the applications, window region information and transparency information for a window rendered from the first application, the transparency information indicating that transparency is enabled for the window, the window region information defining a hit-region within the window;
    modifying an original frame of the window to create a modified frame based on the window region information and the transparency information such that the hit-region within the window for the modified frame is rendered with a transparency value satisfying the threshold level of transparency;
    providing a display of the window with the modified frame;
    detecting a first input event outside the hit-region;
    adjusting, responsive to detecting the first input event and despite the threshold level of transparency having been set, the transparency value such that the transparency value no longer satisfies the threshold level of transparency;
    detecting a second input event inside the hit-region; and,
    adjusting, responsive to detecting the second input event, the transparency value such that the transparency value satisfies the threshold level of transparency.

2. The method of claim 1, wherein the threshold level of transparency limits the transparency of the hit-region such that the hit-region is at least partially visible to a user.

3. The method of claim 1, wherein the hit-region is an area within the window that accepts an input event.

4. The method of claim 1, wherein the window region information further defines a pass-through region, the pass-through region being an area within the window that passes-through an input event to an underlying window or a desktop.

5. The method of claim 1, wherein the threshold level of transparency includes a first threshold level of transparency and a second threshold level of transparency, and the method further comprises creating the modified frame such that the hit-region satisfies the first threshold level of transparency and a pass-through region, defined by the window region information, satisfies the second threshold level of transparency, the second threshold level of transparency being different than the first threshold level of transparency.

6. The method of claim 1 further comprising:
    receiving a request for full transparency of the hit-region of the window, and
    creating the modified frame such that the hit-region is completely or substantially transparent during a period of time after which the hit-region is constrained by the threshold level of transparency.

7. The method of claim 1, further comprising:
    generating a filter based on the region defined by the window region information; and
    modifying the original frame to create the modified frame by applying the filter to the original frame.

8. The method of claim 7, wherein the modified frame is displayed within a browser.

9. A method for rendering a window of an application, the method being performed by at least one processor, the method comprising:
    setting, by a window manager, first and second threshold levels of transparency for all applications in a computing device, the first and second threshold levels of transparency being independent of the applications and being adjustable to any value below 100% transparency;
    receiving, by the window manager and from a first application of the applications, transparency information and window region information for a window to be rendered from the first application, the transparency information indicating that transparency is enabled for the window, the window region information defining a hit-region within the window;
    generating, by the window manager, a filter based on the hit-region identified by the window region information;
    receiving, by a visual processing unit, the filter generated by the window manager;
    applying, by the visual processing unit, the filter to an original frame of the window to create a modified frame such that the hit-region of the window meets the first threshold level of transparency and a region outside the hit-region meets the second threshold level of transparency, the first threshold level of transparency being different than the second threshold level of transparency;
    providing, by the visual processing unit, a display of the window with the modified frame on a graphical user interface such that the hit-region is at least partially visible to a user and the region outside the hit-region is at least partially transparent;
    detecting a first input event within the region outside the hit-region;
    adjusting, responsive to detecting the first input event and despite the first threshold level of transparency having been set, transparency of the hit-region such that the hit-region no longer satisfies the first threshold level of transparency;

detecting a second input event inside the hit-region; and adjusting, responsive to detecting the second input event, the transparency of the hit-region such that the transparency of the hit-region satisfies the first threshold level of transparency.

10. The method of claim 9, wherein the transparency information and the window region information are received via an application programming interface (API).

11. The method of claim 9, wherein the window region defines a shape of the hit-region, the shape of the hit-region being rectangular.

12. The method of claim 9, wherein the filter includes an arrangement of data adjusters that correspond to an arrangement of pixels of the original frame.

13. The method of claim 9, wherein the first application includes a remote application, and the window includes a browser window.

14. A non-transitory computer-readable medium storing executable instructions that when executed by at least one processor are configured to:

setting, by a window manager, first and second threshold levels of transparency for all applications in a computing device, the first and second threshold levels of transparency being independent of the applications and being adjustable to any value below 100% transparency;

receive, from a first application of the applications, window region information for a window to be rendered from the first application, the window region information defining a first region within the window;

receive an original frame of the window rendered by the application;

modify the original frame to create a modified frame based on the window region information such that the first region meets the first threshold level of transparency and a second region meets a second threshold level of transparency, the second region being separate from the first region;

provide a display of the window with the modified frame such that the first region is at least partially visible to a user and the second region at least partially transparent;

detecting a first input event within the second region;

adjusting, responsive to detecting the first input event and despite the first threshold level of transparency having been set, transparency of the first region such that the first region no longer satisfies the first threshold level of transparency;

detecting a second input event inside the first region; and adjusting, responsive to detecting the second input event, the transparency of the first region such that the transparency of the first region satisfies the first threshold level of transparency.

15. The non-transitory computer-readable medium of claim 14, wherein the executable instructions to modify the original frame to create the modified frame are configured to:

generate a filter based on the window region information; and composite the modified frame by applying the filter to the original frame.

16. The non-transitory computer-readable medium of claim 15, wherein the executable instructions to generate the filter are implemented on a browser executed by a computer processing unit (CPU), and the executable instructions to composite the modified frame are implemented by a graphical processing unit (GPU).

17. The non-transitory computer-readable medium of claim 14, wherein the executable instructions are configured to:

receive transparency information of the window, the transparency information including a transparency attribute, the transparency attribute including a first value or a second value, the first value indicating that transparency is enabled for the window, the second value indicating that transparency is not enabled for the window.

\* \* \* \* \*